US012785469B2

(12) United States Patent
Martin et al.

(10) Patent No.: US 12,785,469 B2
(45) Date of Patent: Nov. 3, 2026

(54) INTEGRATED SEALING FOR INTERNAL COOLING PASSAGES OF ELECTRIC MACHINE LAMINATED CORES

(71) Applicant: GE Infrastructure Technology LLC, Greenville, SC (US)

(72) Inventors: Matthew R. Martin, Schenectady, NY (US); John R. Yagielski, Niskayuna, NY (US); Wei Zhang, Niskayuna, NY (US); Michael Mack, Schenectady, NY (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 218 days.

(21) Appl. No.: 18/592,157

(22) Filed: Feb. 29, 2024

(65) Prior Publication Data

US 2025/0279681 A1 Sep. 4, 2025

(51) Int. Cl.
*H02K 1/20* (2006.01)
*H02K 5/10* (2006.01)

(52) U.S. Cl.
CPC ................. *H02K 1/20* (2013.01); *H02K 5/10* (2013.01)

(58) Field of Classification Search
CPC ...... H02K 1/20; H02K 15/121; H02K 15/122; H02K 5/10
See application file for complete search history.

(56) References Cited

U.S. PATENT DOCUMENTS 11,050,421 B2 6/2021 Schlezinger
11,804,746 B2 10/2023 Bodla et al.
2009/0174279 A1 7/2009 Sheaffer et al.
2010/0252643 A1 10/2010 Hug et al.
2012/0249090 A1 10/2012 Sridharan et al.
2016/0359385 A1 12/2016 Buskirk et al.
2018/0062482 A1 3/2018 Giardino et al.
2019/0390679 A1* 12/2019 Guntermann ............ H02K 5/04
2021/0273502 A1* 9/2021 McDonald ............. H02K 9/197
2022/0251971 A1 8/2022 Pazinski et al.
2022/0310493 A1* 9/2022 Downs ................... H02K 11/33
2022/0360124 A1* 11/2022 Xing .................... H02K 15/021
2023/0017636 A1* 1/2023 Vanhee .................... H02K 3/24
2023/0105407 A1* 4/2023 Leonardi .................. H02K 9/19 310/54
2023/0187995 A1* 6/2023 Eriksen .................... H02K 7/06 310/75 R (Continued)

FOREIGN PATENT DOCUMENTS

DE 102015216684 A1 * 3/2017 ............... H02K 5/10

OTHER PUBLICATIONS

Extended European Search Report, EP 25156157.7, dated Jul. 16, 2025 (8 pp.).

(Continued)

*Primary Examiner* — Christopher M Koehler
*Assistant Examiner* — Ethan Nguyen Vo
(74) *Attorney, Agent, or Firm* — Eversheds Sutherland (US) LLP

(57) ABSTRACT

The present application provides a stator suitable for an application of an insulating varnish or resin in a vacuum pressure impregnation process. The stator includes a number of conductive windings and a coolant passage extending through the stator. The coolant passage is sealed via a coolant passage seal.

19 Claims, 5 Drawing Sheets

(56) References Cited

U.S. PATENT DOCUMENTS

| | | | | |
|---|---|---|---|---|
| 2023/0336045 | A1 | 10/2023 | Martin et al. | |
| 2024/0128835 | A1 * | 4/2024 | Nyberg .................. | H02K 9/197 |

OTHER PUBLICATIONS

Kuhn, Darl, Method for Impregnation of a Machine, ip.com, IP Com Inc, West Henrietta, NKY, US, Apr. 19, 2017, ISSN: 1533-0001 (18 pp.).

* cited by examiner

INTEGRATED SEALING FOR INTERNAL COOLING PASSAGES OF ELECTRIC MACHINE LAMINATED CORES

TECHNICAL FIELD

The present application and the resultant patent relate generally to electric machines such as motors and generators used in the production of electrical power and more particularly relate to integrated sealing of cooling passages during the application of an insulating varnish and/or resin.

BACKGROUND OF THE INVENTION

Generally described, electric machines such as motors, generators, and the like used in the production of electrical power may include a stator and a rotor. One or both of the stator and the rotor may include conductive windings or coils therein. During the manufacture of the electric machine, a vacuum pressure impregnation (VPI) process applies an insulating varnish and/or resin to the stator. During the VPI process, the varnish/resin is applied in a liquid form and a vacuum is applied to force the varnish/resin to penetrate and encapsulate the stator. A pressurization process and a thermal curing process then may be used to cure the insulating varnish/resin. Both vacuum and pressure help the resin to penetrate within the stator. Other types of resin application processes may be used herein such as dip coating, trickle varnish, and the like.

The overall power output of the electric machine may be limited due to the buildup of heat in the rotor components and/or the stator components. Such a buildup of heat may be reduced at least in part by the use of a flow of different types of coolants therethrough. Specifically, higher power density electric machines may require close proximity cooling for both core and armature coil losses. The use of internal coolant passages within the laminated stator core itself allows for efficient heat transfer. These coolant passages, however, may be disrupted or damaged during the application of the insulating varnish/resin and especially during the subsequent machine process to open the coolant passages. The coolant passages could be blocked or significantly reduced in size. Moreover, foreign object debris may be a concern in the cooling system as a whole.

SUMMARY OF THE INVENTION

The present application and the resultant patent thus provide a stator suitable for an application of an insulating varnish or resin in a vacuum pressure impregnation process. The stator includes a number of conductive windings and a coolant passage extending through the stator. The coolant passage is sealed via a coolant passage seal.

The present application and the resultant patent further may provide a method of manufacturing a stator for an electrical machine. The method may include the steps of drilling a coolant passage through the stator, sealing the coolant passage with a coolant passage seal, applying an insulating varnish or resin to the stator in a vacuum pressure impregnation process, and removing the coolant passage seal from the coolant passage.

The present application and the resultant patent further may provide an electric machine stator suitable for an application of an insulating varnish or resin in a vacuum pressure impregnation process. The electric machine may include a rotor, a stator, a number of conductive windings in the stator, and a number of coolant passages extending through the stator. Each of the coolant passages is sealed via a coolant passage seal.

These and other features and improvements of the present application and the resultant patent may become apparent to one of ordinary skill in the art upon review of the following detailed description when taken in conjunction with the several drawings and the appended claims.

BRIEF DESCRIPTION

DETAILED DESCRIPTION

Figure 1:
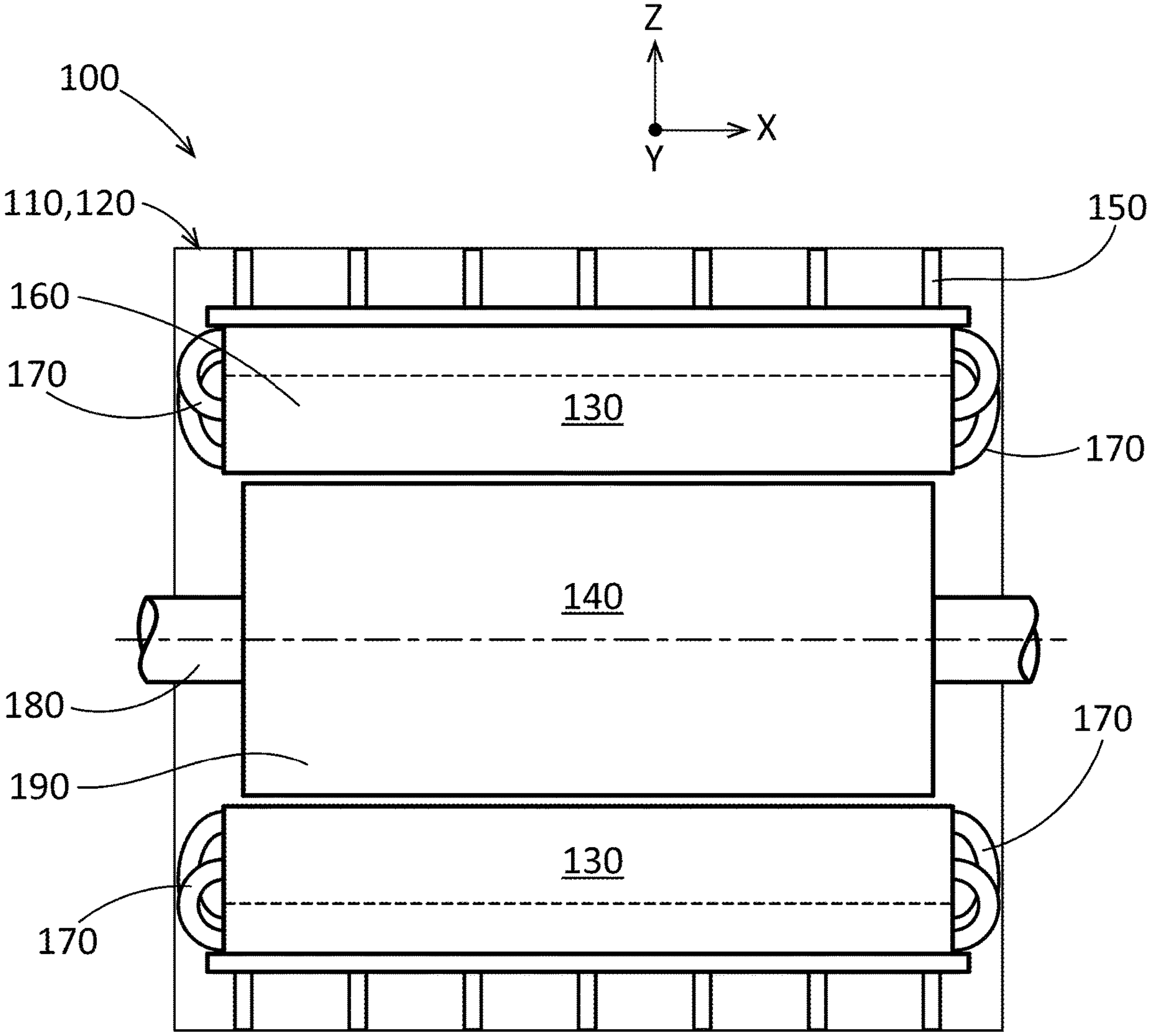
FIG. 1 is a schematic diagram of an electric machine with a stator and a rotor.

Referring now to the drawings, in which like numerals refer to like elements throughout the several views, FIG. 1 is a schematic diagram of an example of an electric machine 100. Generally described, the electric machine 100 may be a motor 110, a generator 120, and the like. The electric machine 100 may include a stator 130 and a rotor 140. The stator 130 may include a stator frame 150 and a body 160 that may include a number of conductive windings 170 positioned about a magnetic core. (Alternatively, the rotor 140 may include a conductive winding about a magnetic core). The rotor 140 may include a shaft 180 having a rotational axis RA. The stator 130 is disposed around the rotor 140. The shaft 180 may be driven to rotate about the rotational axis RA by, for example, a gas turbine, a steam turbine, a wind turbine, a hydro turbine, an internal combustion engine, or any other suitable device configured to provide a rotational output. The shaft 180 is coupled to a substantially cylindrical body 190. The rotor 140 is disposed within the stator 130, which is configured to provide a stationary magnetic field. As described above, rotation of the rotor 140 within the stator 130 may generate electrical current in the conductive windings 170, thereby producing an electrical output from the electric machine 100. The electric machine described herein is for the purpose of example only. Many different components and configuration may be used.

Figure 2:
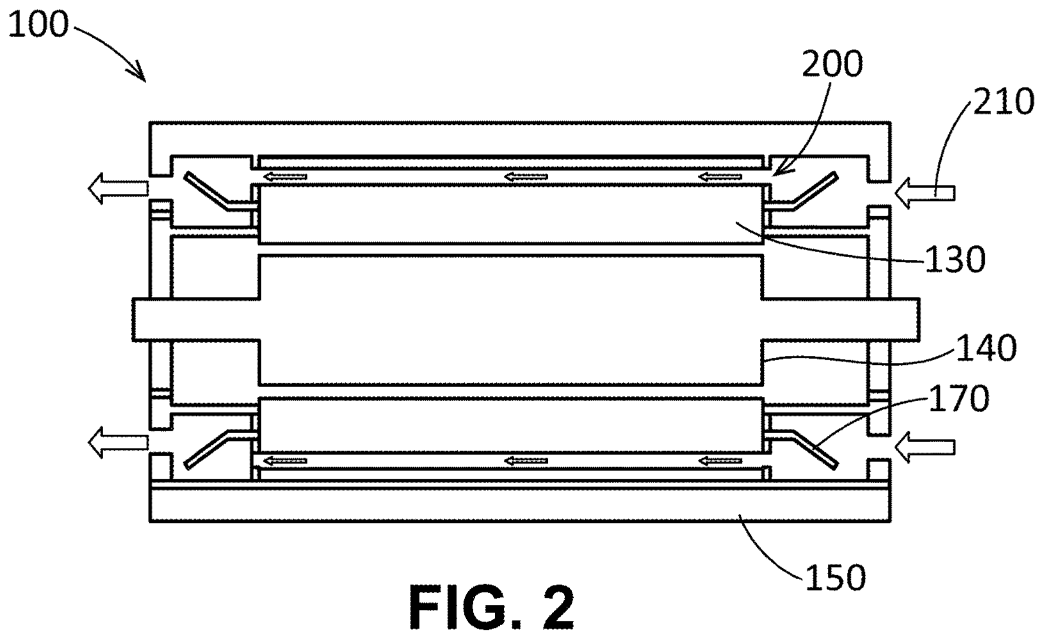
FIG. 2 is a further schematic diagram of an electric machine with coolant passages extending through the stator.

FIG. 2 is a simplified schematic diagram of the electric machine 100. In this example, a number of coolant passages 200 extend through the stator 130 adjacent to the conductive windings 170. The coolant passages 200 may be drilled through the stator 130 in a laser cutting process and the like. The coolant passages 200 may have any suitable geometry. Any number of the coolant passages 200 may be used herein. A cooling flow 210 thus may enter into the frame 150, pass through the coolant passages 200 adjacent to the conductive windings 170, and exit via the other end of the stator 130 and the frame 150. The cooling flow 210 may be any suitable medium. Suitable pumps, blowers, and the like may be used. Certain embodiments also may have coolant pathways within the rotor 140.

Figure 3:
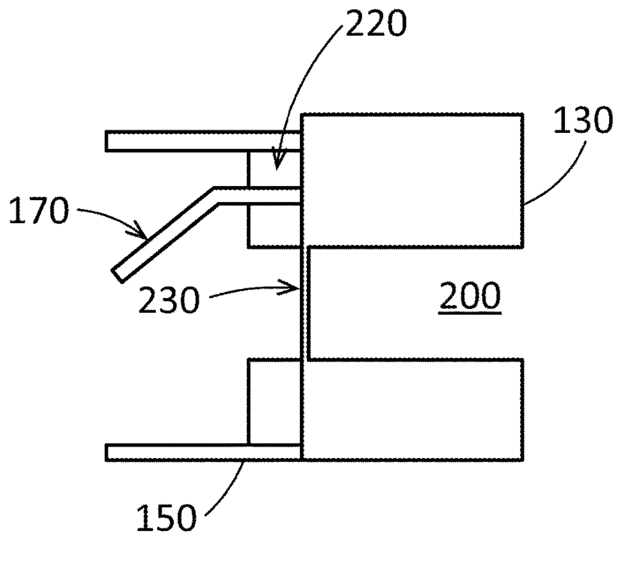
FIG. 3 is a schematic diagram of a coolant passage closed by a thin lamination stack.
Figure 4:
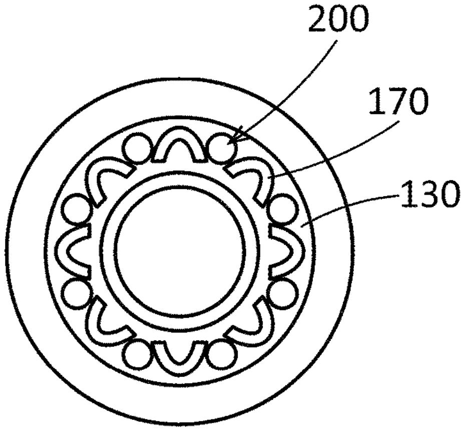
FIG. 4 is a further schematic diagram of the closed coolant passage of FIG. 3.
Figure 5:
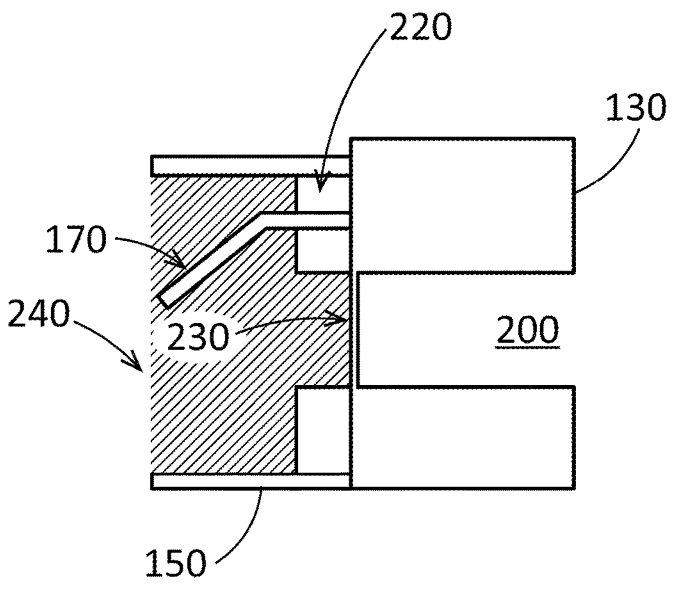
FIG. 5 is a schematic diagram of the closed coolant passage of FIG. 3 covered with insulating varnish/resin.
Figure 6:
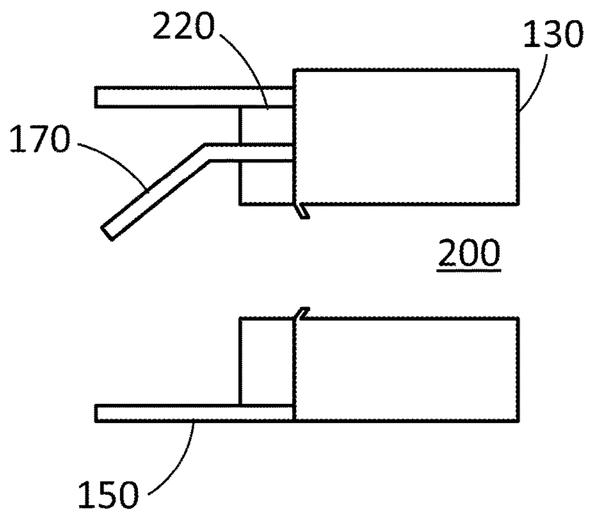
FIG. 6 is a schematic diagram of the coolant passage of FIG. 3 in an open state.
Figure 7:
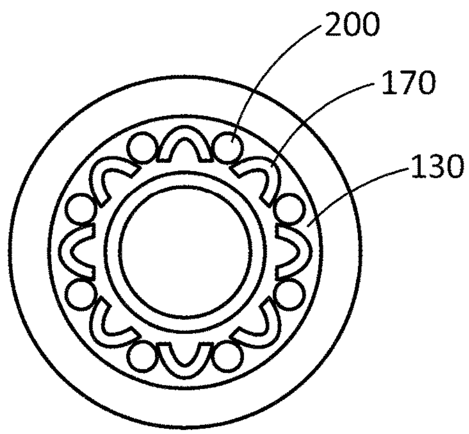
FIG. 7 is a further schematic diagram of the open coolant passage of FIG. 6.

FIGS. 3 and 4 show a portion of the stator 130 about the coolant passage 200 before the application of the insulating varnish/resin. The coolant passage 200 may be encircled by a core end ring 220 and may be enclosed by a thin lamination stack 230 before the VPI processing. FIG. 5 shows the application of an insulating varnish/resin 240 during the VPI process. Any type of conventional varnish/resin 240 may be used herein. FIGS. 6 and 7 show an open coolant passage 200 after the VPI processing wherein the insulating varnish/resin 240 and the thin lamination stack 230 may be removed via a conventional machining process and the like. Any type of removal methods may be used herein.

Figure 8:
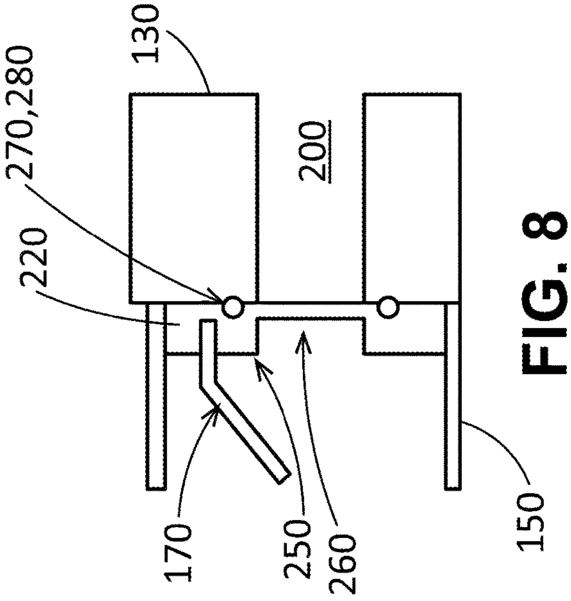
FIG. 8 is a schematic diagram of a coolant passage closed by an extended core end ring.
Figure 9:
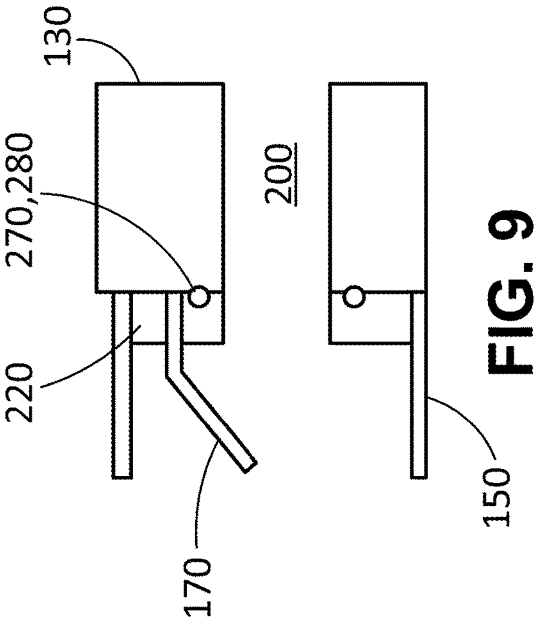
FIG. 9 is a schematic diagram of the coolant passage of FIG. 8 in an open state.

FIGS. 8 and 9 show the use of a coolant passage seal 250 as may be described herein. In this example, the coolant passage seal 250 may be an extended core end ring 260. As is shown in FIG. 8, the extended core end ring 260 may extend over the length of stator 130 and enclose the coolant passage 200. The extended core end ring 260 may be applied to the stator 130 before VPI processing and the application of the insulting varnish/resin 240. The extended core end ring 260 may be applied to the stator 130 via an O-ring 270 and an adhesive 280 to seal the coolant passage 200. The O-ring 270 and the adhesive 280 may be of conventional design. FIG. 9 shows an open coolant passage 200. The extended core end ring 260 may be removed, punctured, drilled, machined, or otherwise cleared. Other components and other configurations may be used herein.

Figure 10:
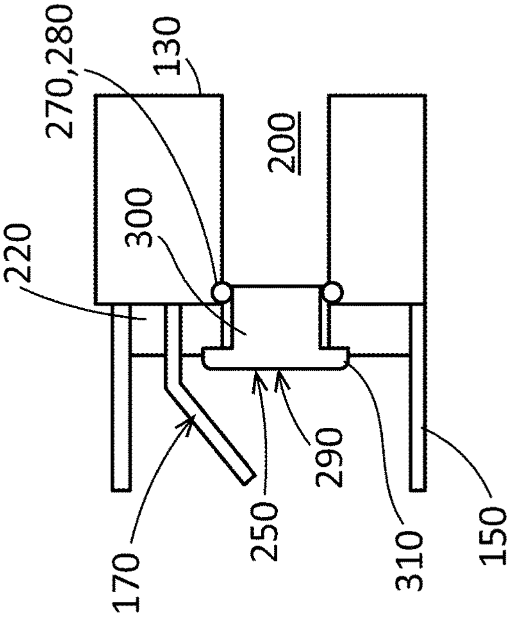
FIG. 10 is a schematic diagram of a coolant passage closed by a sealing plug.
Figure 11:
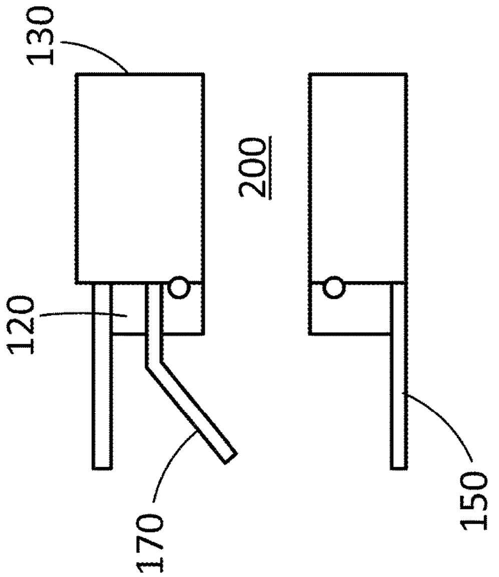
FIG. 11 is a schematic diagram of the coolant passage of FIG. 10 in an open state.

FIGS. 10 and 11 show a further example of the coolant passage seal 250 as may be described herein. In this case, a sealing plug 290 is shown in FIG. 10. The sealing plug 290 may have a plug body 300 sized to mate with the core end ring 220 and the coolant passage 200. The sealing plug 290 may have the O-ring 270 and the adhesive 280 on one end of the plug body 300 about the coolant passage 200 and an extended flange 310 on the other end of the plug body 300 outside of or adjacent to the core end ring 220. The sealing plug 290 may be inserted into the coolant passage 200 before the application of the insulating varnish/resin 240 in the VPI processes. FIG. 11 shows an open coolant passage 200. The sealing plug 290 may be removed or otherwise cleared from the coolant passage 200. Other component and other configurations may be used herein.

Figure 12:
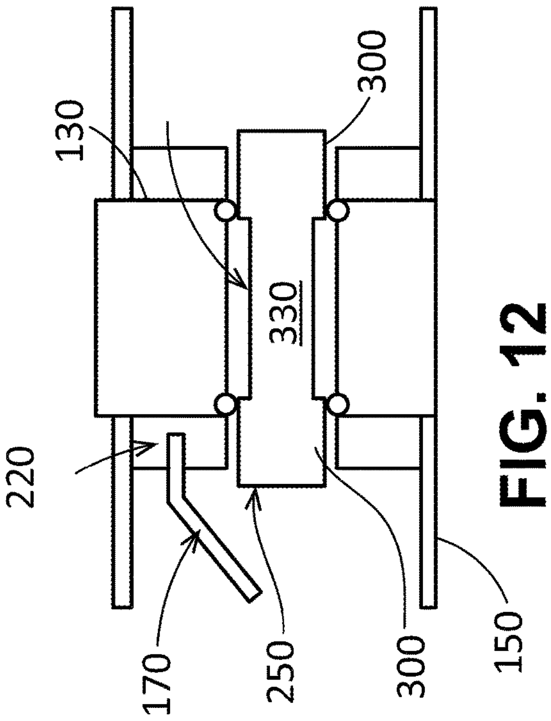
FIG. 12 is a schematic diagram of a coolant passage closed by an extended sealing plug.
Figure 13:
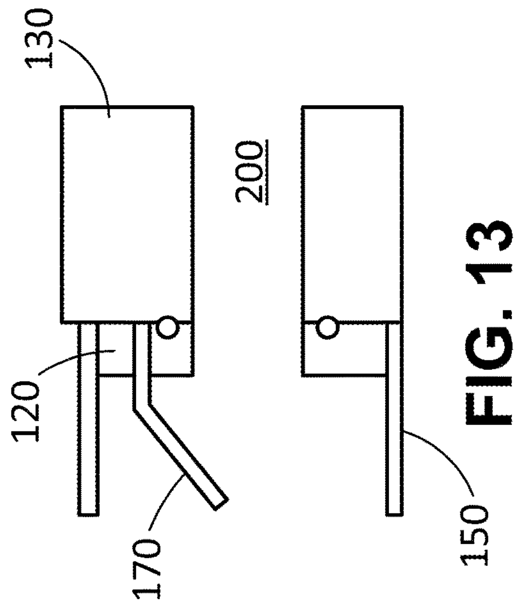
FIG. 13 is a schematic diagram of the coolant passage of FIG. 12 in an open state.

FIGS. 12 and 13 show a further example of the coolant passage seal 250 as may be described herein. In this case, an extended sealing plug 320 is shown in FIG. 12. The extended sealing plug 320 may be similar to the sealing plug 290 described above, but with a plug body connector 330 extending through the length of the coolant passage 200. The extended sealing plug 320 thus may have a plug body 300 with the O-ring 270 and the adhesive 280 positioned on either end of the plug body connector 330. The extended sealing plug 320 may be inserted into the coolant passage 200 before the application of the insulating varnish/resin 240 in the VPI processes. FIG. 13 shows an open coolant passage 200. The extended sealing plug 320 may be removed or otherwise cleared from the coolant passage 200. Other component and other configurations may be used herein.

Figure 14:
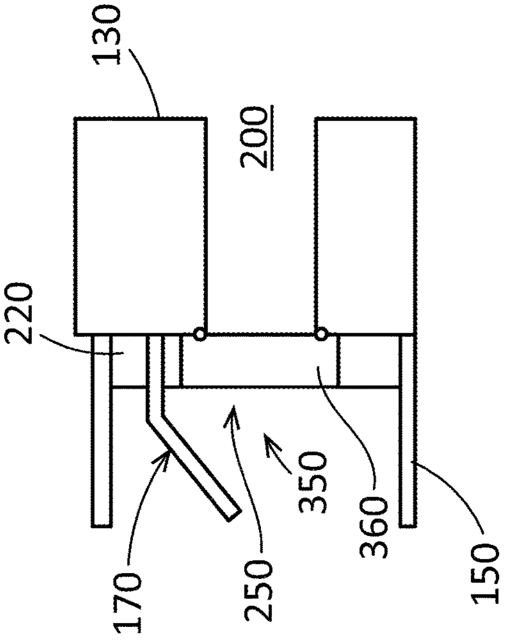
FIG. 14 is a schematic diagram of a coolant passage closed by a threaded sealing plug.
Figure 15:
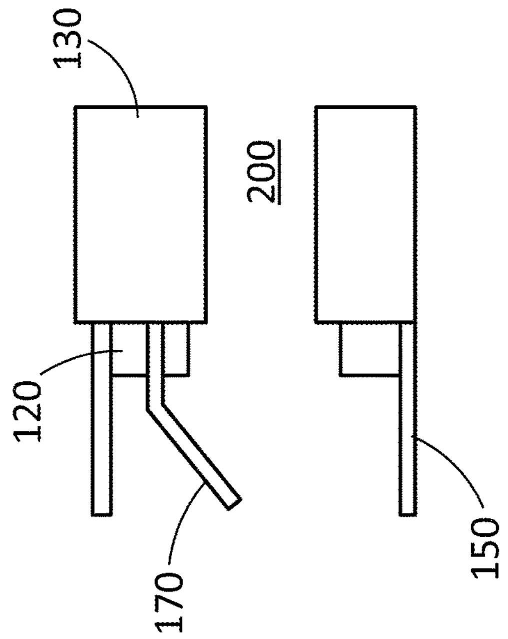
FIG. 15 is a schematic diagram of the coolant passage of FIG. 14 in an open state.

FIGS. 14 and 15 show a further example of the coolant passage seal 250 as may be described herein. In this case, a threaded sealing plug 350 is shown in FIG. 14. The threaded sealing plug 350 may have a threaded body 360 sized to mate with the core end ring 220 and may have accommodating threads therein. The threaded sealing plug 350 may have the O-ring 270 and the adhesive 280 on one end of the threaded body 360 about the coolant passage 200. The threaded sealing plug 350 may be inserted into the core end ring 220 about the coolant passage 200 before the application of the insulating varnish/resin 240 in the VPI processes. FIG. 15 shows an open coolant passage 200. The threaded sealing plug 350 may be removed or otherwise cleared from the coolant passage 200. Other component and other configurations may be used herein.

The coolant passage seal 250 thus provides an effective seal for the coolant passages 200 in the stator 130 of the electric machine 100 during the application of the varnish/resin 240 during the VPI processes. By sealing these coolant passages 200 during processing, the shape, size, path, and other types of geometries of the coolant passages 200 may be designed for performance without any hindrances for manufacturability or resin processing. The use of the coolant passage seal 250 largely eliminates concerns over foreign object debris created in the overall manufacturing process.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A stator suitable for an application of an insulating varnish or resin in a vacuum pressure impregnation process, comprising: a plurality of conductive windings; and a coolant passage extending through the stator; wherein the coolant passage is sealed via a coolant passage seal.

2. The stator of any preceding clause, further comprising a plurality of coolant passages and wherein each of the plurality of coolant passages is sealed via the coolant passage seal.

3. The stator of any preceding clause, wherein the coolant passage is surrounded by a core end ring.

4. The stator any preceding clause, wherein the coolant passage seal comprises an extended core end ring.

5. The stator of any preceding clause, wherein coolant passage seal comprises an O-ring and an adhesive applied to the extended core end ring.

6. The stator of any preceding clause, wherein the coolant passage seal comprises a sealing plug.

7. The stator of any preceding clause, wherein the sealing plug comprises a plug body and an extended flange.

8. The stator of any preceding clause, wherein coolant passage seal comprises an O-ring and an adhesive applied to the sealing plug.

9. The stator of any preceding clause, wherein the coolant passage seal comprises an extended sealing plug.

10. The stator of any preceding clause, wherein the extended sealing plug comprises a pair of sealing plugs connected by a plug body connector.

11. The stator of any preceding clause, wherein coolant passage seal comprises an O-ring and an adhesive applied to the extended sealing plug.

12. The stator of any preceding clause, wherein the coolant passage seal comprises a threaded sealing plug.

13. The stator of any preceding clause, wherein the threaded sealing plug comprises a threaded body.

14. The stator of any preceding clause, wherein coolant passage seal comprises an O-ring and an adhesive applied to the threaded sealing plug.

15. A method of manufacturing a stator for an electrical machine, comprising: drilling a coolant passage through the stator; sealing the coolant passage with a coolant passage seal; applying an insulating varnish or resin to the stator in a vacuum pressure impregnation process; and removing the coolant passage seal from the coolant passage.

16. An electric machine stator suitable for an application of an insulating varnish or resin in a vacuum pressure impregnation process, comprising: a rotor; a stator; a plurality of conductive windings in the stator; and a plurality of coolant passages extending through the stator; wherein each of the plurality of coolant passages is sealed via a coolant passage seal.

17. The electric machine of any preceding clause, wherein the coolant passage seal comprises an extended core end ring.

18. The electric machine of any preceding clause, wherein the coolant passage seal comprises a sealing plug.

19. The electric machine of any preceding clause, wherein the coolant passage seal comprises an extended sealing plug.

20. The electric machine of any preceding clause, wherein the coolant passage seal comprises a threaded sealing plug.

We claim:

1. A stator suitable for an application of an insulating varnish or resin in a vacuum pressure impregnation process, comprising:

a stator body;

a plurality of conductive windings; and a plurality of coolant passages extending through the stator body;

wherein each of the plurality of coolant passages is sealed via a removable coolant passage seal configured to prevent infiltration of the insulating varnish or resin into the plurality of coolant passages during the vacuum pressure impregnation process.

2. The stator of claim 1, wherein the coolant passage is surrounded by a core end ring.

3. The stator of claim 1, wherein the removable coolant passage seal comprises an extended core end ring.

4. The stator of claim 3, wherein the removable coolant passage seal comprises an O-ring and an adhesive applied to the extended core end ring.

5. The stator of claim 1, wherein the removable coolant passage seal comprises a sealing plug.

6. The stator of claim 5, wherein the sealing plug comprises a plug body and an extended flange.

7. The stator of claim 5, wherein the removable coolant passage seal comprises an O-ring and an adhesive applied to the sealing plug.

8. The stator of claim 1, wherein the removable coolant passage seal comprises an extended sealing plug.

9. The stator of claim 8, wherein the extended sealing plug comprises a pair of sealing plugs connected by a plug body connector.

10. The stator of claim 8, wherein the removable coolant passage seal comprises an O-ring and an adhesive applied to the extended sealing plug.

11. The stator of claim 1, wherein the removable coolant passage seal comprises a threaded sealing plug.

12. The stator of claim 11, wherein the threaded sealing plug comprises a threaded body.

13. The stator of claim 11, wherein the removable coolant passage seal comprises an O-ring and an adhesive applied to the threaded sealing plug.

14. A method of manufacturing a stator for an electrical machine, comprising:

drilling a plurality of coolant passages through a stator body of the stator;

sealing the plurality of coolant passages with a removable coolant passage seal to prevent infiltration of an insulating varnish or resin into the plurality of coolant passages;

applying an insulating varnish or resin to the stator in a vacuum pressure impregnation process; and removing the coolant passage seal from the plurality of coolant passages after the vacuum pressure impregnation process.

15. An electric machine-stator suitable for an application of an insulating varnish or resin in a vacuum pressure impregnation process, comprising:

a rotor;

a stator;

the stator comprising a stator body;

a plurality of conductive windings in the stator body; and a plurality of coolant passages extending through the stator body;

wherein each of the plurality of coolant passages is sealed via a removable coolant passage seal configured to prevent infiltration of the insulating varnish or resin into the plurality of coolant passages during the vacuum pressure impregnation process.

16. The electric machine of claim 15, wherein the removable coolant passage seal comprises an extended core end ring.

17. The electric machine of claim 15, wherein the removable coolant passage seal comprises a sealing plug.

18. The electric machine of claim 15, wherein the removable coolant passage seal comprises an extended sealing plug.

19. The electric machine of claim 15, wherein the removable coolant passage seal comprises a threaded sealing plug.

* * * * *